H. J. BEHRENS.
MILK PAIL.
APPLICATION FILED APR. 26, 1909.
927,481.
Patented July 13, 1909.
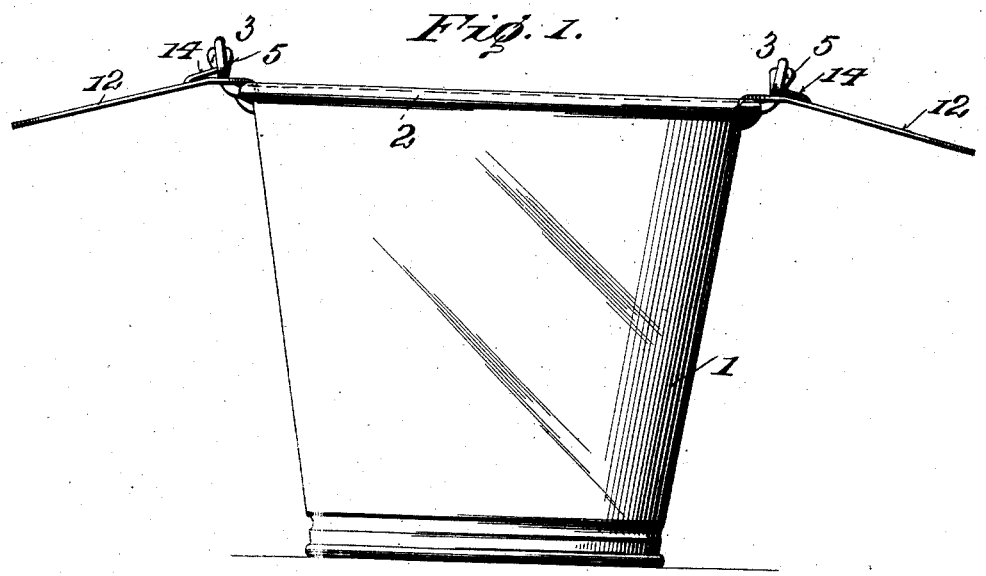
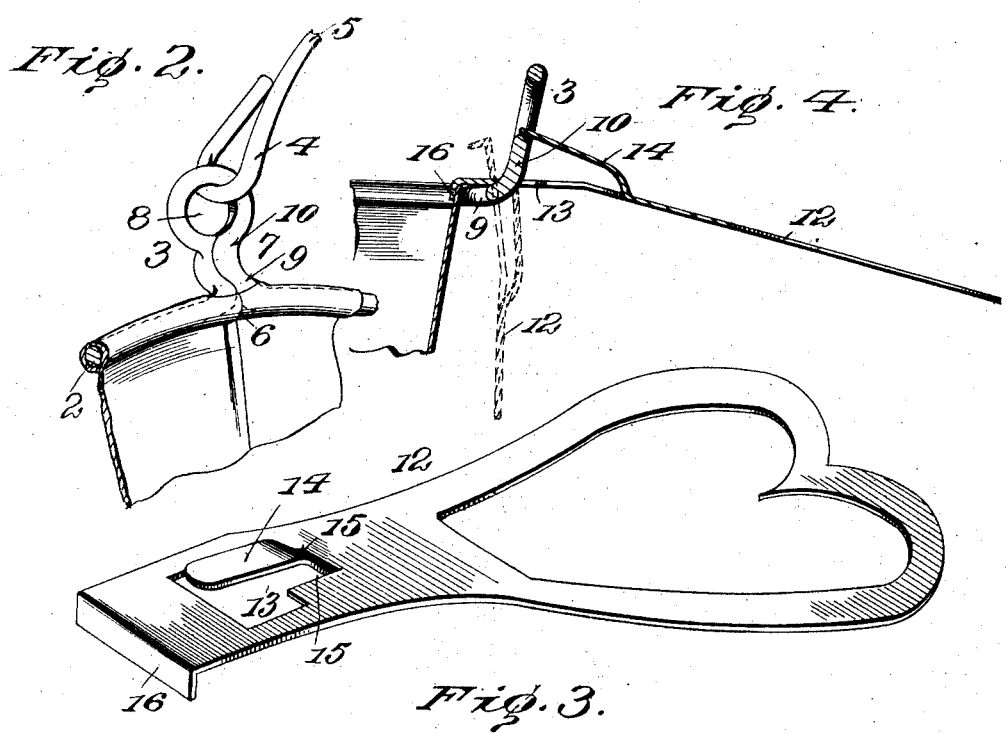

UNITED STATES PATENT OFFICE.

HENRY J. BEHRENS, OF WINONA, MINNESOTA.

MILK-PAIL.

No. 927,481.  Specification of Letters Patent.  Patented July 13, 1909.

Application filed April 26, 1909. Serial No. 492,139.

*To all whom it may concern:*

Be it known that I, HENRY J. BEHRENS, a citizen of the United States, residing at Winona, in the county of Winona and State of Minnesota, have invented certain new and useful Improvements in Milk-Pails, of which the following is a specification.

My invention relates to certain new and useful improvements in milk-pails and the object thereof is the production of a pail of this character provided with a particular form of knee-rest or pail support, the ears of the pail to which the bail is attached being peculiarly formed to coöperate with such support.

With this and other objects in view my invention consists in certain constructions, combinations and arrangements of parts the preferred form of which will be first described in connection with the accompanying drawings and then the invention particularly pointed out in the appended claims.

Referring to the drawings wherein the same part is designated by the same reference numeral wherever it occurs: Figure 1 is a side elevation of a pail provided with my improvements; Fig. 2 is a detail perspective view showing the construction of one of the ears; Fig. 3 is a perspective view of one of the supports, and Fig. 4 is a detail sectional view taken through one of the ears and showing the pail support in raised position in full lines and in lowered position in dotted lines.

1 designates the body of the pail, and 2 a strengthening wire which extends around the pail near its top over which the upper edge of the pail is turned down or curled. The wire is formed on diametrically opposite sides with ears 3 with which the hook portions 4 of the bail 5 engage. The upper portion of the pail is cut away on each side at 6, so that its edge can be rolled over the strengthening wire 2. Each ear is formed by extending out a portion of the strengthening wire 2 and forming the same into a loop by compressing together the wire for some distance, so that the two sides of the loop are in close contact with each other and parallel to each other, forming a reduced or neck portion 7, and the circular opening 8 in the ear. The loops after they have been formed are bent upwardly as shown to form an outwardly extending portion 9 and an upwardly extending portion 10 of the neck 7 and with the opening 8 at the upper end of the portion 10. In the body portion, of the support 12, I form a substantially rectangular opening 13 of a size adapted to pass over the ear of the pail and onto the reduced neck before the bail has been placed in position.

14 is a tongue formed in the body portion of the support by a pair of slits 15 cut therein, said tongue being struck up from the plane of the body portion and having its free end extending into the opening 13. This tongue is adapted to enter the opening 8 to steady the rest and hold the same in its raised position. The end of the support beyond the opening 13 is bent down to form a flange 16, which is adapted to catch over the edge of the pail when the support is in its raised position.

It will be noted that forming the ear in the manner heretofore described produces an opening 8 which is substantially circular, as this provides a form of opening into which the tongue may readily pass and also one in which the bail will move freely without liability of catching, as is the case where the opening is not so formed. When the supports are to be used they are moved up into the position shown in Fig. 1, so that when the pail is placed between the legs of the person using the same the supports will rest on his knees and hold the pail in proper position for milking.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. A pail provided with a bail, ears formed from loops of wire, the opposite sides of the loop being pressed into contact with each other and extending parallel and in contact with each other to form a neck, a support provided with an opening adapted to surround the neck, and a tongue formed in the support and projecting into said opening for the purpose described.

2. A milk pail provided with ears for the bail in combination with a support, comprising a plate having an opening formed near one end thereof and a tongue formed in the plate with its free end projecting into said opening.

3. A milk pail provided with ears for the bail, in combination with a support, comprising a plate having one edge extending at right angles to the plane of the support, an opening formed in the support adjacent said angular portion, and adapted to surround the ear of the pail, and a tongue formed in the plate and projecting into said opening.

In testimony whereof I affix my signature in presence of two witnesses.

HENRY J. BEHRENS.

Witnesses:
 D. E. TAWNEY,
 W. J. SMITH.